(12) United States Patent
Justice et al.

(10) Patent No.: US 8,825,926 B2
(45) Date of Patent: Sep. 2, 2014

(54) PROCESSOR WITH ASSIGNABLE GENERAL PURPOSE REGISTER SET

(75) Inventors: Robert Sean Justice, Chandler, AZ (US); Tyler Nye Boddie, Gilbert, AZ (US); Joseph Triece, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 73 days.

(21) Appl. No.: 12/749,065

(22) Filed: Mar. 29, 2010

(65) Prior Publication Data

US 2010/0262805 A1  Oct. 14, 2010

Related U.S. Application Data

(60) Provisional application No. 61/168,699, filed on Apr. 13, 2009.

(51) Int. Cl.
*G06F 3/00* (2006.01)
*G06F 5/00* (2006.01)
*G06F 13/26* (2006.01)
*G06F 9/46* (2006.01)

(52) U.S. Cl.
CPC ............. *G06F 13/26* (2013.01); *G06F 9/462* (2013.01)
USPC ............................................. 710/37; 710/51

(58) Field of Classification Search
USPC ...................................................... 710/37, 51
See application file for complete search history.

(56) References Cited

U.S. PATENT DOCUMENTS

| 5,155,853 | A | * | 10/1992 | Mitsuhira et al. | 710/261 |
| 6,029,242 | A | * | 2/2000 | Sidman | 712/42 |
| 7,117,319 | B2 | | 10/2006 | Arimilli et al. | 711/156 |
| 2008/0091867 | A1 | | 4/2008 | Plondke et al. | 710/261 |
| 2009/0248935 | A1 | * | 10/2009 | Ehrlich et al. | 710/264 |

FOREIGN PATENT DOCUMENTS

| CN | 1504883 A | 6/2004 | G01R 31/3185 |
| EP | 1115060 A2 | 7/2001 | G06F 9/46 |
| EP | 1122643 A1 | 8/2001 | G06F 9/46 |

OTHER PUBLICATIONS

International PCT Search Report and Written Opinion, PCT/US2010/030721, 12 pages, Mailed Oct. 6, 2010.
Chinese Office Action, Application No. 201080009765.1, 16 pages, Oct. 31, 2013.

* cited by examiner

*Primary Examiner* — Zachary K Huson
(74) *Attorney, Agent, or Firm* — King & Spalding L.L.P.

(57) ABSTRACT

A processor has a central processing unit (CPU), a first CPU register set, a second CPU register set, a multiplexer logic for either coupling the first or the second CPU register set with the CPU, and control logic for controlling the multiplexer logic to switch from the first CPU register set to the second CPU register set upon receipt of at least one of a plurality of interrupt signals, wherein the at least one of a plurality of interrupt signals must meet a condition that is programmable within the control logic.

21 Claims, 4 Drawing Sheets

Configuration Registers

| Disable [2:0] | Select [2:0] | Int-Priority | Shadow Set |
|---|---|---|---|
| 111 | xxx | 0-7 | 0 |
| 110 | 111 | 0-6 | 0 |
| | | 7 | 1 |
| 110 | 110 | 0-5, 7 | 0 |
| | | 6 | 1 |
| 110 | 101 | 0-4, 6-7 | 0 |
| | | 5 | 1 |
| 110 | 100 | 0-3, 5-7 | 0 |
| | | 4 | 1 |
| 110 | 011 | 0-2, 4-7 | 0 |
| | | 3 | 1 |
| 110 | 010 | 0-1, 3-7 | 0 |
| | | 2 | 1 |
| 110 | 001 | 0, 2-7 | 0 |
| | | 1 | 1 |
| 110 | 000 | 1-7 | 0 |
| | | 0 | 1 |
| 100 | 111, 110, 101 | 0-4 | 0 |
| | | 5 | 1 |
| | | 6 | 2 |
| | | 7 | 3 |
| 100 | 100 | 0-3, 5 | 0 |
| | | 4 | 1 |
| | | 6 | 2 |
| | | 7 | 3 |
| 100 | 011 | 0-2, 4-5 | 0 |
| | | 3 | 1 |
| | | 6 | 2 |
| | | 7 | 3 |
| 100 | 010 | 0-1, 3-5 | 0 |
| | | 2 | 1 |
| | | 6 | 2 |
| | | 7 | 3 |
| 100 | 001 | 0, 2-5 | 0 |
| | | 1 | 1 |
| | | 6 | 2 |
| | | 7 | 3 |
| 100 | 000 | 1-5 | 0 |
| | | 0 | 1 |
| | | 6 | 2 |
| | | 7 | 3 |
| 000 | xxx | 0 | 0 |
| | | 1 | 1 |
| | | 2 | 2 |
| | | 3 | 3 |
| | | 4 | 4 |
| | | 5 | 5 |
| | | 6 | 6 |
| | | 7 | 7 |

*Figure 5*

PROCESSOR WITH ASSIGNABLE GENERAL PURPOSE REGISTER SET

CROSS-REFERENCE TO RELATED APPLICATIONS

This application claims the benefit of U.S. Provisional Application No. 61/168,699 filed on Apr. 13, 2009, entitled "ASSIGNABLE GENERAL PURPOSE REGISTER SET", which is incorporated herein in its entirety.

TECHNICAL FIELD

The present application relates to microprocessors, such as microcontrollers, and in particular to interrupt controllers used in microprocessors or microcontrollers.

BACKGROUND

Microprocessors and in particular microcontrollers, use interrupt controllers to manage a plurality of possible interrupt sources and program exception handling. Interrupts generally request an exception in the sequential processing of a program. If this interrupt request is handled, the execution of an interrupt service routine (ISR) will occur. An ISR allows the program to properly handle the respective interrupt source, thus removing the interrupt's request. However, entering and exiting the respective ISR requires context saving and restoring. Context saving and restoring will be referred to as any operations preformed by the program to ensure that the microprocessor returns to the sequential processing of the program in the same state as it was before an interrupt request occurred. This context saving and restoring will also be referred to as interrupt latency, and will be measured as a unit of time starting from the time the first operation of context saving or restoring occurs and ends when the last operation of context saving and restoring occurs. ISR content saving will be referred to as preamble and context restoring will be referred to as post-amble. In particular, preamble may include a register set associated with the central processing unit (CPU) of the microprocessor or microcontroller. A register set or register file is generally used in combination with an arithmetic logic unit (ALU) of the CPU to perform arithmetic and/or logic as well as data/address moving operations on data or addresses stored in these registers. Thus, even though, generally, such a register set is considered to be part of the CPU, for purposes of this application the term register set or register file may be used separately from the term CPU. However, no limitation is to be inferred from the way these terms are used. A register set can be within or outside a CPU.

The preamble or post-amble of the ISR can have varying degrees of latency. Hence, high frequency interrupt requests with high ISR latency can consume significant processor time In order to reduce ISR latency, microprocessors or microcontrollers may have a separate register set for ISRs which is referred to as a shadow register set. For example, the 32-bit microcontroller PIC32MX3XX/4XX manufactured by Microchip have a processor core that automatically switches to a shadow register set whenever the highest assignable interrupt priority is serviced. However, this known system is not flexible and may be difficult to be adapted for controlling systems that manage multiple interrupt sources. Hence, a more flexible system is needed.

SUMMARY

According to an embodiment, a processor may comprise a central processing unit (CPU); a first CPU register set; a second CPU register set; a multiplexer logic for either coupling said first or said second CPU register set with said CPU; and control logic for controlling said multiplexer logic to switch from said first CPU register set to said second CPU register set upon receipt of at least one of a plurality of interrupt signals, wherein said at least one of a plurality of interrupt signals must meet a condition that is programmable within said control logic.

According to a further embodiment, the condition can be a interrupt priority. According to yet a further embodiment, the condition can be a interrupt identification. According to a further embodiment, the processor may comprise a plurality of second CPU register sets. According to yet a further embodiment, the multiplexer may select either the first or one of the second CPU register sets. According to yet a further embodiment, the processor may further comprise another multiplexer to select one of the plurality of second CPU register sets. According to yet a further embodiment, the processor may further comprise a programmable configuration register for determining the condition. According to yet a further embodiment, the processor may further comprise a plurality of programmable configuration register for determining a plurality of conditions. According to yet a further embodiment, the processor may further comprise at least two programmable configuration register for selecting one of a plurality of predetermined assignments, each assignment associating one of the plurality of second CPU register sets to a condition. According to yet a further embodiment, the first configuration register may enable or disable a programmable number of available second register sets and the second register set determines an assignment of at least one of the plurality of second register sets. According to yet a further embodiment, the processor may be a microcontroller having eight register file sets.

According to another embodiment, a method for providing a processor with a central processing unit (CPU) register set may comprise the steps of: programming a condition for switching from a first to a second CPU register set; selecting the first CPU register set; and selecting the second CPU register set after receiving of at least one of a plurality of interrupt signals, wherein the at least one of a plurality of interrupt signals meets the condition.

According to yet a further embodiment of the method, the condition can be a interrupt priority. According to yet a further embodiment of the method, the condition can be a interrupt identification. According to yet a further embodiment of the method, the step of selecting the second CPU register set may comprise selecting one of a plurality of second CPU register sets. According to yet a further embodiment of the method, the step of programming a condition may comprise writing data into at least one configuration register. According to yet a further embodiment of the method, the step of programming a condition may comprise writing data into a plurality of configuration register. According to yet a further embodiment of the method, the method may further comprise the step of determining a plurality of assignments of a second CPU register set to a condition and selecting one of the assignments depending on at least a first parameter and the condition. According to yet a further embodiment of the method, the method may further comprise a second parameter, wherein the first parameter determines a number of available second register sets and the second parameter determines an assignment of at least one of the plurality of second register sets. According to yet a further embodiment of the method, the processor is a microcontroller having eight register file sets.

BRIEF DESCRIPTION OF THE DRAWINGS

A more complete understanding of the present disclosure and advantages thereof may be acquired by referring to the following description taken in conjunction with the accompanying drawings wherein:

FIG. 5 is an assignment table showing a possible assignment depending on the content of configuration registers.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

According to various embodiments, a microprocessor or microcontroller may be equipped with a selection system for a plurality of shadow register sets to improve system performance and lower device power. According to the teachings of this disclosure, a user may assign which assignable interrupt priority would receive the shadow register set. The shadow set assignment could be chosen, but not limited to, at compile time to allow the compiler to generate the correct prologue and epilogue associated with the priorities.

An integrated circuit device, e.g., microcontroller, having more than one general purpose register set may use at least one assignable general purpose register set for allowing a software developer to associate a general purpose register set to an interrupt priority level. By being able to associate the general purpose register set to an interrupt priority level, the associated general purpose registers (register set) are able to reduce interrupt latency no matter what the interrupt priority level. This can be very useful for handling interrupts that occur at a high frequency, but may not be assigned the highest priority.

Figure 1:
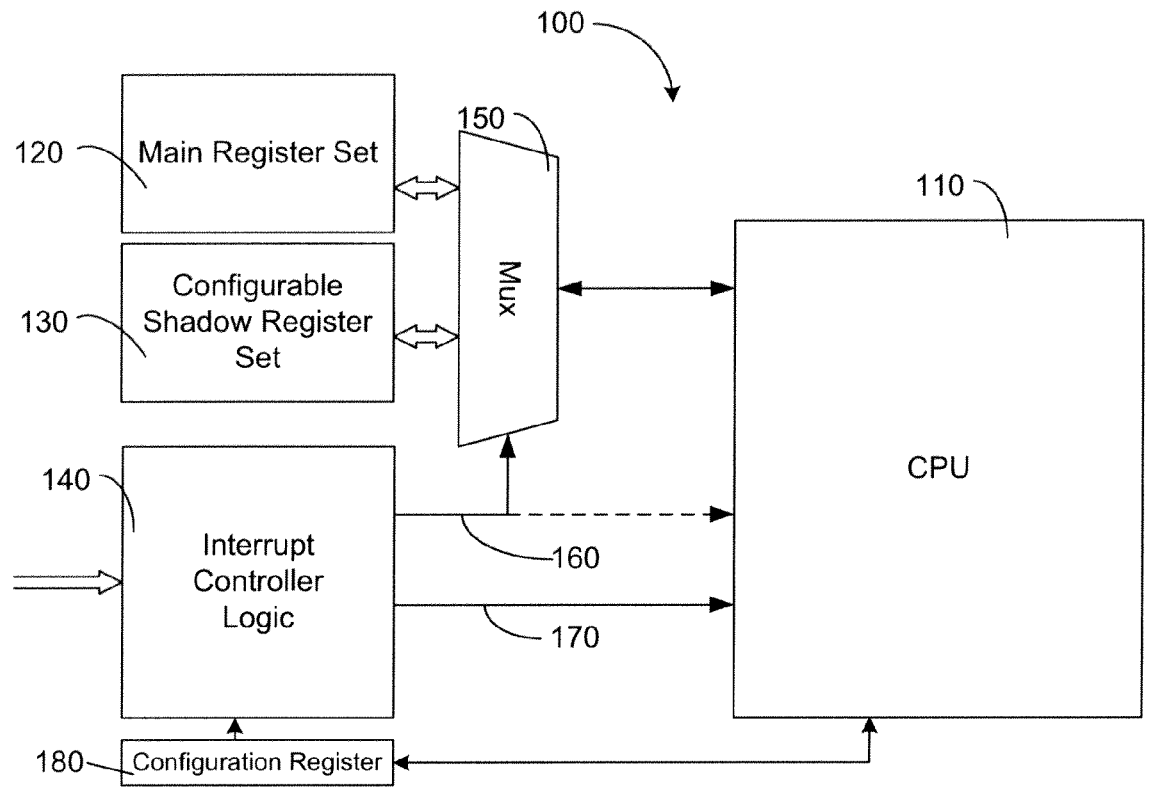
FIG. 1 is a schematic block diagram of a first embodiment of a microprocessor or microcontroller with an assignable shadow register set.

FIG. 1 shows a first embodiment of microprocessor or microcontroller having an assignable shadow register set. A central processing unit (CPU) 110 is coupled to either a main register set 120 or a shadow register set 130 by means of a multiplexer logic 150. Furthermore, an interrupt controller 140 handles a plurality of interrupt sources according to assigned priorities. The priority may be signaled to the CPU 110 via one or more control lines 160. The control signal 160 is used to control multiplexer logic 150. Furthermore, one or more signals 170 are used to feed one or more respective interrupt signals to CPU 110.

Software may be used configure a shadow set of registers 130 to map priority levels to one or more general purpose register shadow set. To this end, a configuration register 180 may be used to individually assign a priority level to one or more shadow register files 130. For example, as an interrupt arrives to the interrupt controller 140, multiplexer logic 150 presents a user specified shadow set 130 to CPU 110 depending on the programming of configuration register 180 for use in servicing the arriving interrupt.

For example, a first interrupt may be occurring at a rate of 1 MHz and another interrupt may be occurring at a rate of 5 kHz. According to one scenario, the 5 kHz interrupt must be able to interrupt the 1 MHz, thus must be set to a higher priority level. To save CPU 110 bandwidth, for example by switching between main register set 120 and shadow register set 130 during prologue/epilogue, the user may want to assign the shadow register set 130 to the same priority of the 1 MHz interrupt. It is to be noted in this scenario, that raising the 1 MHz interrupt to the highest priority level in not an option in this case. In a conventional system, only the 5 kHz interrupt would be able to use the shadow register file. However, according to various embodiments, the use of the shadow register file 130 can be synchronized with the priority level. According to another embodiment, the configuration register is used to specifically identify an interrupt source, for example a specific interrupt vector, to which the shadow register file will be assigned when the respective ISR for this interrupt source is executed. According to this embodiment, only a single interrupt would cause the switching to the shadow register file set 130 whereas when using a priority level such a switch would occur for any interrupt that is assigned to the respective priority.

Figure 2:
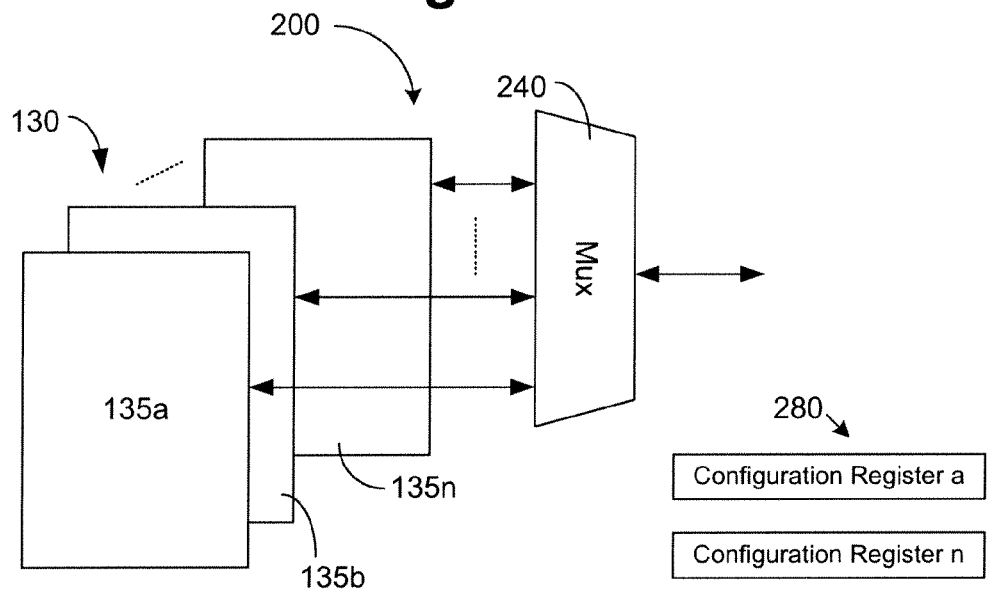
FIG. 2 is a schematic block diagram of a possible implementation of multiple shadow register sets.

FIG. 2 shows a further embodiment which provides for multiple shadow register file sets 135a . . . n. Here either an additional multiplexer logic 240 may be used to select one of the shadow register file sets 135a or multiplexer logic 140 could be expanded to select either the main register file set 120 or one of the plurality of shadow register file sets 135a . . . n. In this embodiment, multiple configuration registers 280a . . . n for each register file set 135a . . . n or a set of registers for predefined assignments may be used as will be explained below in more detail.

Figure 3:
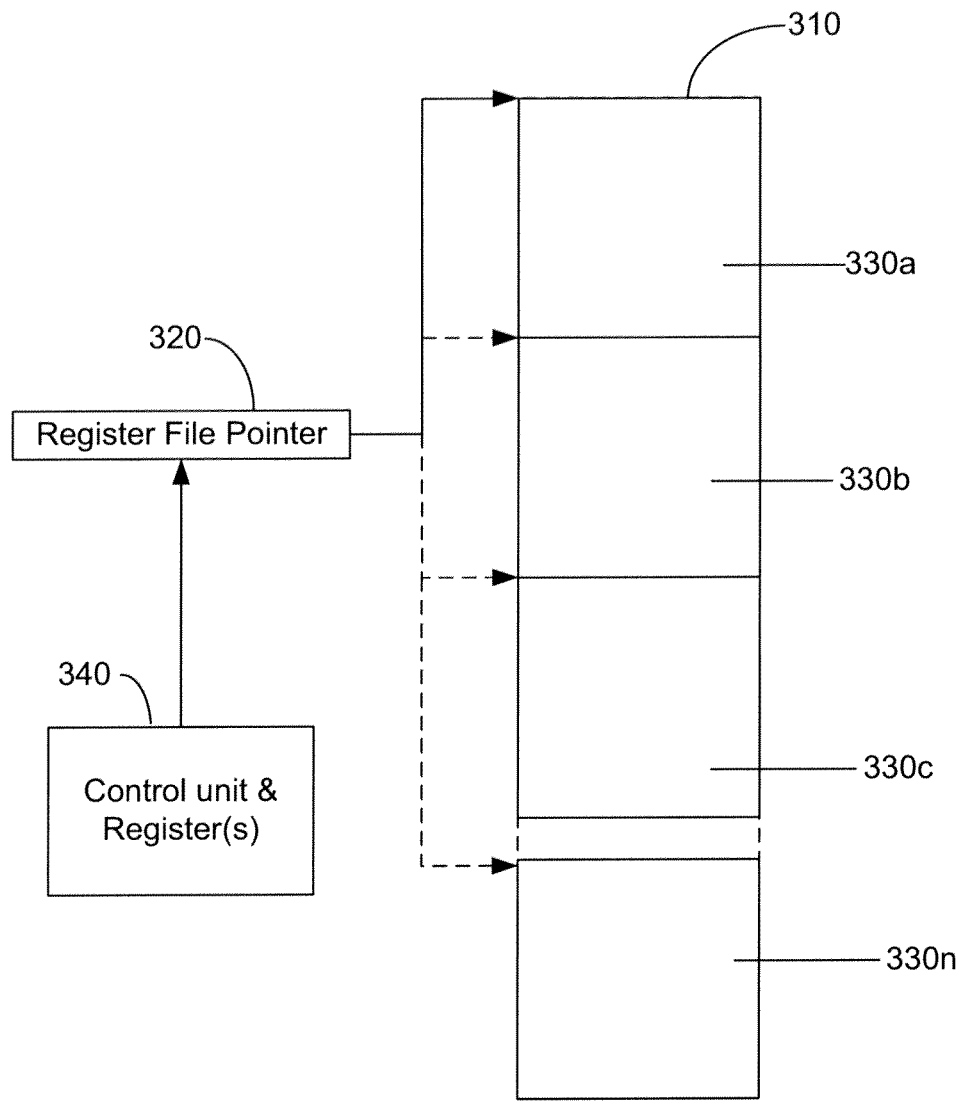
FIG. 3 is a schematic block diagram of another possible implementation of multiple shadow register sets.

FIG. 3 shows yet another embodiment in which the shadow register file sets 130 and optionally the main register file set 120 are embodied within memory 310 that comprises multiple register file set pages 330a . . . n. In this embodiment a control unit 340 that may contain one or more configuration registers is used to set a register file pointer 320. In this embodiment, page 330a could be configured to form the main register file set and pages 330b . . . n may form multiple shadow register files. Control unit 340 automatically switches the register file pointer 320 to the pre-programmed page depending on the interrupt source or interrupt priority level as described above.

Figure 4:
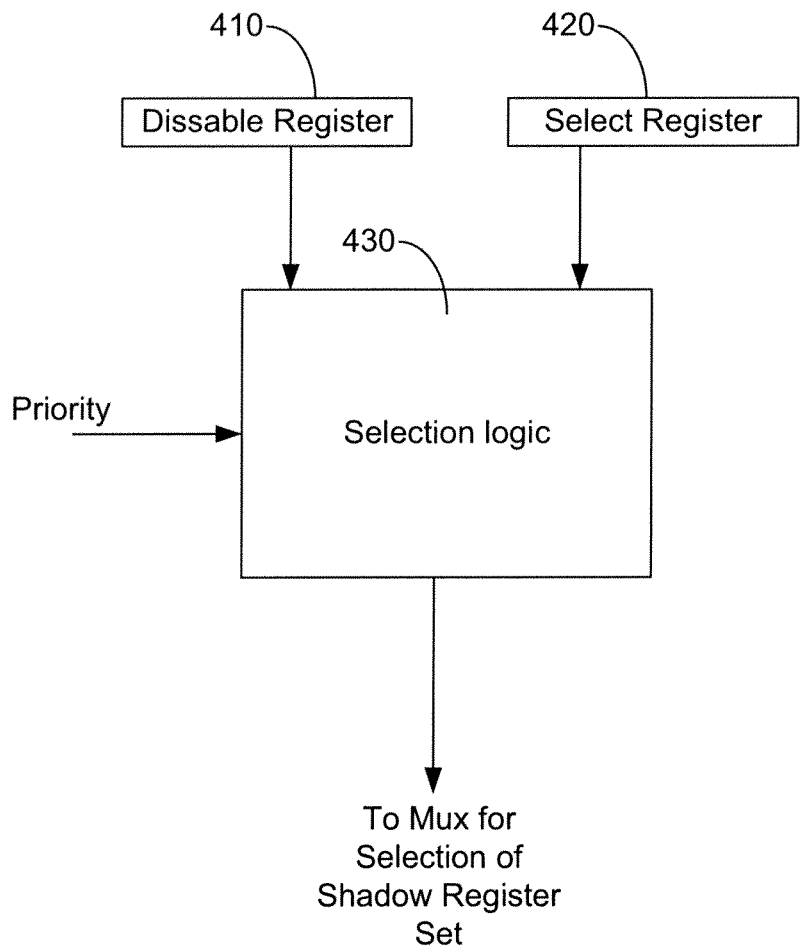
FIG. 4 is a schematic block diagram of a possible control logic for selecting a shadow register set.

FIG. 4 shows another embodiment of controlling the specific assignment of a plurality of shadow register files. In this embodiment, a disable or enable register 410 and a select register 420 are used which are coupled with selection logic 430. Selection logic 430 further receives the priority information from the interrupt controller and outputs a control signal for the multiplexer to select one of the shadow register sets. By means of the disable/enable register 410, for example, the number of useable shadow register file sets could be limited. For example, if eight additional shadow register file sets are embodied, each bit of an eight bit register 410 could be used to specifically enable or disable one of the plurality of shadow file register sets. Select register 420 could then be used to specifically assign the available registers to a specific priority level. According to one embodiment, for example, certain fixed assignments depending on the number of available registers may be used and select register 420 may be used to select different assignments.

FIG. 5 shows a possible assignment table for use in a system having eight interrupt priority levels 0-7 and eight additional shadow file register sets 0-7. Disable/enable register 410 may have 3 bits [2:0] used to enable 1, 2, 4, or eight shadow register file sets. In this embodiment, value "111" selects a single shadow register file, "110" two shadow register file sets, "100" four shadow register file sets, and "000" eight shadow register file sets. Select register also may have three bits [2:0] to provide for eight different assignments. According to this embodiment, the select register 420 and the disable register 410 are used for choosing pre-programmed assignments as shown in FIG. 5. According to another embodiment, the table may be arranged differently. For example, the assignments may differ according to specific requirements. In other embodiments, the table may not include the first and last row as shown in FIG. 5.

If the number of available shadow sets is one, as shown by setting disable register 410="111", then any priority level will cause a switch to shadow register file set 0. If the number of available shadow register file sets is two, as shown by setting disable register 410="110", then this embodiment allows for eight different settings wherein each setting assigns shadow register file set 1 to a single priority whereas all other priorities use shadow file register set 0. If the number of available shadow sets is four, as shown by setting disable register 410="100", then this embodiment allows for six different settings wherein each setting has a fixed assignment for priority levels 6 and 7 to shadow register file sets 2 and 3, respectively and a variable assignment of shadow register file sets 0 and 1. Here, shadow register file set 1 can be assigned to one of the priorities 0-5 whereas the remaining priorities use shadow file register set 0. Finally, if the number of available shadow sets is eight, as shown by setting disable register 410="000", then each priority level 0-7, will cause a switch to a respective shadow register file set 0-7. It is to be noted that shadow register file set 0 can be the main register file, for example, if priority level 0 represents the main program. Thus, there is no distinction necessary between main register file and shadow register file.

Furthermore as can be seen in FIG. 5, even though the shown table is particularly useful, it merely gives one specific example of providing different more or less fixed assignments of priority levels to different shadow register file sets. This table may be too restrictive or too complex and a more or less complex assignment can be designed according to various other embodiments.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A processor comprising:
   a central processing unit (CPU);
   a first CPU register set;
   a second CPU register set;
   a multiplexer logic for either coupling said first or said second CPU register set with said CPU wherein the first CPU register set or the second CPU register set forms a general purpose register set of the CPU;
   control logic for controlling said multiplexer logic to switch from said first CPU register set to said second CPU register set upon receipt of at least one of a plurality of interrupt signals only if said at least one of a plurality of interrupt signals meets an additional condition that is programmable within said control logic.

2. The processor according to claim 1, wherein said additional condition is based on an interrupt priority.

3. The processor according to claim 1, wherein said additional condition is based on an interrupt identification.

4. The processor according to claim 1, comprising a plurality of second CPU register sets.

5. The processor according to claim 4, wherein said multiplexer selects either said first or one of said second CPU register sets.

6. The processor according to claim 4, further comprising another multiplexer to select one of said plurality of second CPU register sets.

7. The processor according to claim 1, further comprising a programmable configuration register for determining said condition.

8. The processor according to claim 4, further comprising a plurality of programmable configuration register for determining a plurality of conditions.

9. The processor according to claim 4, further comprising at least two programmable configuration register for selecting one of a plurality of predetermined assignments, each assignment associating one of the plurality of second CPU register sets to a condition.

10. The processor according to claim 9, wherein the first configuration register enables or disables a programmable number of available second register sets and the second register set determines an assignment of at least one of said plurality of second register sets.

11. The processor according to claim 10, wherein the processor is a microcontroller having eight register file sets.

12. A method for providing a processor with a central processing unit (CPU) register set, comprising the steps of:
    programming a condition for switching from a first to a second CPU register set;
    selecting and coupling the first CPU register set with the CPU as a general purpose CPU register set; and
    selecting and coupling the second CPU register set with the CPU as a general purpose CPU register set after receiving of at least one of a plurality of interrupt signals only if said at least one of a plurality of interrupt signals meets said condition and otherwise not switching from the first to the second CPU register set.

13. The method according to claim 12, wherein said condition is based on an interrupt priority.

14. The method according to claim 12, wherein said condition is based on an interrupt identification.

15. The method according to claim 12, wherein the step of selecting the second CPU register set comprises selecting one of a plurality of second CPU register sets.

16. The method according to claim 12, wherein the step of programming a condition comprises writing data into at least one configuration register.

17. The method according to claim 15, wherein the step of programming a condition comprises writing data into a plurality of configuration registers.

18. The method according to claim 15, further comprising the step of determining a plurality of assignments of a second CPU register set to a condition and selecting one of said assignments depending on at least a first parameter and said condition.

19. The method according to claim 18, further comprising a second parameter, wherein the first parameter determines a number of available second register sets and the second parameter determines an assignment of at least one of said plurality of second register sets.

20. The method according to claim 19, wherein the processor is a microcontroller having eight register file sets.

21. A processor comprising:
a central processing unit (CPU);
a first general purpose CPU register set;
a second general purpose CPU register set;
a multiplexer logic for either coupling said first or said second CPU register set with said CPU such that the first CPU register set or the second CPU register set forms a general purpose register set of the CPU for performing arithmetic, logic or data/address moving operations;
control logic for controlling said multiplexer logic to switch from said first CPU register set to said second CPU register set upon receipt of at least one of a plurality of interrupt signals, wherein a switch from said first CPU register set to said second CPU register set is only performed if said at least one of a plurality of interrupt signals must meet an additional condition that is programmable within said control logic.

* * * * *